US008856351B2

(12) United States Patent
Armstrong

(10) Patent No.: US 8,856,351 B2
(45) Date of Patent: Oct. 7, 2014

(54) REDUCING LOAD AT A PROXY SERVER

(75) Inventor: Nicholas Armstrong, Waterloo (CA)

(73) Assignee: Pravala Inc., Kitchener, ON (CA)

( * ) Notice: Subject to any disclaimer, the term of this patent is extended or adjusted under 35 U.S.C. 154(b) by 516 days.

(21) Appl. No.: 13/156,907

(22) Filed: Jun. 9, 2011

(65) Prior Publication Data

US 2012/0144047 A1    Jun. 7, 2012

Related U.S. Application Data

(60) Provisional application No. 61/352,994, filed on Jun. 9, 2010.

(51) Int. Cl.
*G06F 15/16* (2006.01)
*H04L 12/46* (2006.01)

(52) U.S. Cl.
CPC ................... *H04L 12/4633* (2013.01)
USPC ............. 709/227; 709/228; 709/229

(58) Field of Classification Search
USPC ........................................................ 709/227
See application file for complete search history.

(56) References Cited

U.S. PATENT DOCUMENTS

| 7,584,508 B1 | 9/2009 | Kashchenko et al. | |
|---|---|---|---|
| 2006/0030319 A1* | 2/2006 | Chou et al. | 455/435.1 |
| 2008/0022094 A1 | 1/2008 | Gupta et al. | |
| 2008/0120699 A1* | 5/2008 | Spear | 726/4 |
| 2009/0031415 A1* | 1/2009 | Aldridge et al. | 726/15 |
| 2009/0089863 A1* | 4/2009 | Vanniarajan | 726/5 |
| 2009/0210282 A1 | 8/2009 | Elenbaas | |
| 2009/0320122 A1* | 12/2009 | Cheng et al. | 726/15 |
| 2011/0083174 A1 | 4/2011 | Aldridge et al. | |

OTHER PUBLICATIONS

International Search Report issued by the Canadian Intellectual Patent Office dated Nov. 14, 2011 for corresponding International Application No. PCT/CA2011/000663 filed Jun. 9, 2011.
Written Opinion of the International Searching Authority issued by the Canadian Intellectual Patent Office dated Nov. 14, 2011 for corresponding International Application No. PCT/CA2011/000663 filed Jun. 9, 2011.

* cited by examiner

*Primary Examiner* — Shaq Taha
(74) *Attorney, Agent, or Firm* — Jonathan Pollack

(57) ABSTRACT

A method is described for reducing a load placed on an endpoint server acting as an endpoint of a tunnel from a client device across a network. The method, implemented at the client device, comprises the following steps. A request to establish a new network connection is received. A risk of establishing the new network connection outside of the tunnel is determined based on a plurality of predefined criteria. The determined risk is compared with a predefined risk threshold and, if the determined risk is less than or equal to the predefined risk threshold, the new network connection is established directly via the network. If the new network connection fails before it is completed it is re-established via the tunnel. If the determined risk is greater than the predefined risk threshold, the new network connection is established via the tunnel. A client device and computer-readable medium configured to implement the method is also described.

17 Claims, 3 Drawing Sheets

REDUCING LOAD AT A PROXY SERVER

This application claims priority from U.S. Provisional Application No. 61/352,994 filed Jun. 9, 2010.

The present invention relates generally to a communication network in which a client communicates with a remote server via a proxy server and specifically to a system and method for reducing the load placed on the proxy server.

BACKGROUND

Network tunnels, often used in the context of virtual private networks (VPNs), create a virtual network link from multiple physical or other virtual links. They do this by encapsulating network traffic at one end of the virtual link and recovering the network traffic at the other end of the virtual link by decapsulating it and re-injecting it into a network. This structure allows a client device to appear to be in a different area of the network than it is actually, physically located. For example, using a network tunnel, a client device can appear to be behind a corporate firewall regardless of its physical location.

Typically, a virtual network interface is used on the client device, assigned an Internet Protocol (IP) address from within an address space of the remote end of the network tunnel, through which some or all of the device's traffic is sent. This architecture allows applications on the client device to operate normally, without any modifications to support the network tunnel.

Since the virtual network interface is assigned a remote IP address, all traffic destined for the client is sent to the end of the network tunnel. As a result, all of the traffic the client decides to tunnel is tunnelled end-to-end. This results in a large traffic load on the VPN concentrator, which must deal with traffic to internal resources and traffic to remote systems.

This problem is exacerbated for a network configuration as described in U.S. Publication No. 2010/0154044, filed Dec. 4, 2009 by Tajinder Manku and titled "Multi-Transport Mode Devices Having Improved Data Throughput". As described by Manku, the client device comprises a plurality of communication interfaces for communicating using different networks. Data to be transmitted to a destination server is scheduled across the plurality of communication interfaces, thereby aggregating the bandwidth capabilities of each communication interface. The data is received by a proxy server, which reassembles the data for transmission to the destination server. Effectively, Manku teaches a virtual network tunnel to transport traffic between the client device and the proxy server using multiple physical networks.

As the system scales, however, so does the load placed on the proxy server. That is, the greater the number of client devices that use the system, the greater the amount of data that has to be handled by the proxy server. Once solution to this problem is to provide a plurality of proxy servers capable of load balancing the tunnels established by the client devices. However, this solution distributes the load, rather than reducing it, and still requires a significant investment in hardware for the proxy server or servers that increases with the number of client devices.

Accordingly, it is desirable to obviate or mitigate at least some of the above mentioned disadvantages.

SUMMARY

In accordance with an aspect of the present invention there is provided a method for reducing a load placed on an endpoint server acting as an endpoint of a tunnel from a client device across a network by implementing, at the client device, the steps of: receiving a request to establish a new network connection; determining a risk establishing the new network connection outside of the tunnel, the risk based on a plurality of predefined criteria relating to the new network connection; comparing the determined risk with a predefined risk threshold; if the determined risk is less than or equal to the predefined risk threshold, establishing the new network connection directly via the network, wherein if the new network connection fails before it is completed it is re-established via the tunnel; and if the determined risk is greater than the predefined risk threshold, establishing the new network connection via the tunnel.

In accordance with a further aspect of the present invention, there is provided a client device configure for reducing a load placed on an endpoint server acting as an endpoint of a tunnel from the client device across a network, the client device comprising: a processor, and a computer-readable medium having stored thereon instructions which, when executed by the processor, cause the processor to: receiving a request to establish a new network connection; determining a risk establishing the new network connection outside of the tunnel, the risk based on a plurality of predefined criteria relating to the new network connection; comparing the determined risk with a predefined risk threshold; if the determined risk is less than or equal to the predefined risk threshold, establishing the new network connection directly via the network, wherein if the new network connection fails before it is completed it is re-established via the tunnel; and if the determined risk is greater than the predefined risk threshold, establishing the new network connection via the tunnel.

In accordance with a further aspect of the invention there is provided a computer-readable medium having stored thereon instructions for reducing a load placed on an endpoint server acting as an endpoint of a tunnel from a client device across a network, the instructions, when executed by a processor, cause the processor to implement the steps of: receiving a request to establish a new network connection; determining a risk establishing the new network connection outside of the tunnel, the risk based on a plurality of predefined criteria relating to the new network connection; comparing the determined risk with a predefined risk threshold; if the determined risk is less than or equal to the predefined risk threshold, establishing the new network connection directly via the network, wherein if the new network connection fails before it is completed it is re-established via the tunnel; and if the determined risk is greater than the predefined risk threshold, establishing the new network connection via the tunnel.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
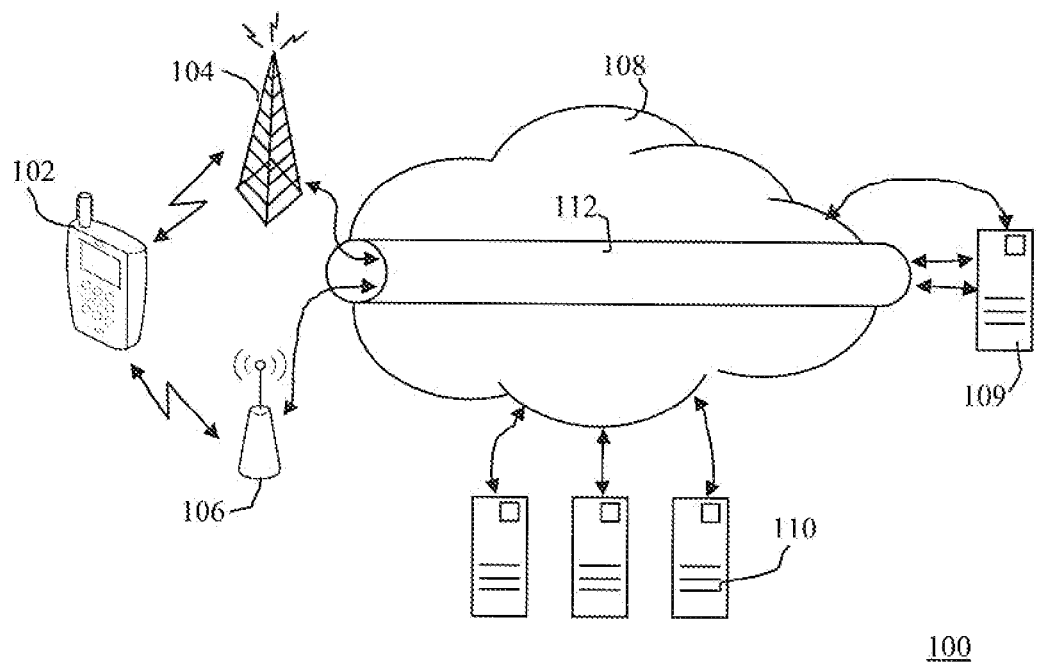
FIG. 1 is a block diagram illustrating a tunnel between a client device and a proxy server, the client device capable of communicating via the tunnel using a plurality of different network interfaces.

For convenience, like numerals in the description refer to like structures in the drawings. Referring to FIG. 1, a network environment as described by Manku is illustrated generally by numeral 100. The network environment 100 comprises a client device 102, a first access point 104, a second access point 106, a network 108, a proxy server 109, and a target server 110. The client device 102 can connect to the network 108 via one or both of the first network access point 104 or the second network access point 106 in order to communicate with the proxy server 109.

In the present embodiment, the network 108 is a Wide Area Network (WAN) such as the Internet. However, as is known the art, the network 108 can comprise a series of interconnected networks, depending on the implementation.

The client device 102 is a computing device such as a portable computer, tablet computer, smartphone, personal digital assistant (PDA) or the like. The client device 102 is configured with a first interface and a second interface for transmitting data to the proxy server 109 via the first access point 104 and the second access point 106, respectively. Accordingly, the data is broken into packets or segments and scheduled for transmission to the proxy server 109 via both the first access point 104 and the second access point 106, thereby improving the overall bandwidth available to the client device 102.

Although the first access point 104 and the second access point 106 can be any access points, such as Ethernet, Wi-Max, Digital Subscriber Loop (DSL), cable, satellite, cellular, Wi-Fi and the like. For ease of the explanation only, the first access point 104 is a cellular base station for communicating over a cellular network. As is known in the art, the cellular base station 104 provides a data packet service such as GSM-based High Speed Packet Access (HSPA).

Similarly, for ease of explanation only, the second access point 106 is a Wi-Fi access point. Accordingly, the Wi-Fi access point 106 can be viewed as a Wireless Local Area Network (WLAN) that provides a gateway to the Internet 108.

The proxy server 109 is a server configured to receive data from the client device 102 via both the first access point 104 and the second access point 106, reassemble it, and transmit it to the target server 110. The proxy server 109 is also configured to receive data from the target server 110 and transmit it to the client device via both the first access point 104 and the second access point 106.

The target server 110 is a remote computing device from which the client device 102 may request information and to which the client device 102 may transmit information via the Internet 108. The target server 110 may be a web server or any other device, such as a mail server, SIP server, and the like, connected to the Internet 108, with which the client device 102 wishes to communicate.

Accordingly, it will be appreciated that a tunnel 112 is created between the client device 102 and the proxy server 109. The tunnel 112 includes the data sent over both the first access point 104 and the second access point 106.

Thus, unlike traditional VPNs that typically communicate over a single interface, the loss of a connection on one of the first or second interfaces, does not necessarily lead to the loss of the virtual tunnel 112. That is, if one of the first or second interfaces fails, data transfer can continue of the other of the first or second interfaces, transparent to a user of the client device 102. This is referred to as seamless handoff. In contrast, any data transmitted outside of the virtual tunnel 112 would be lost if the corresponding interface fails.

However, if care is taken in selecting the type of data to transmit outside of the virtual tunnel 112, the load placed on the proxy server 109 can be reduced and the impact of the lost data can be minimal, as will be described.

Figure 2:
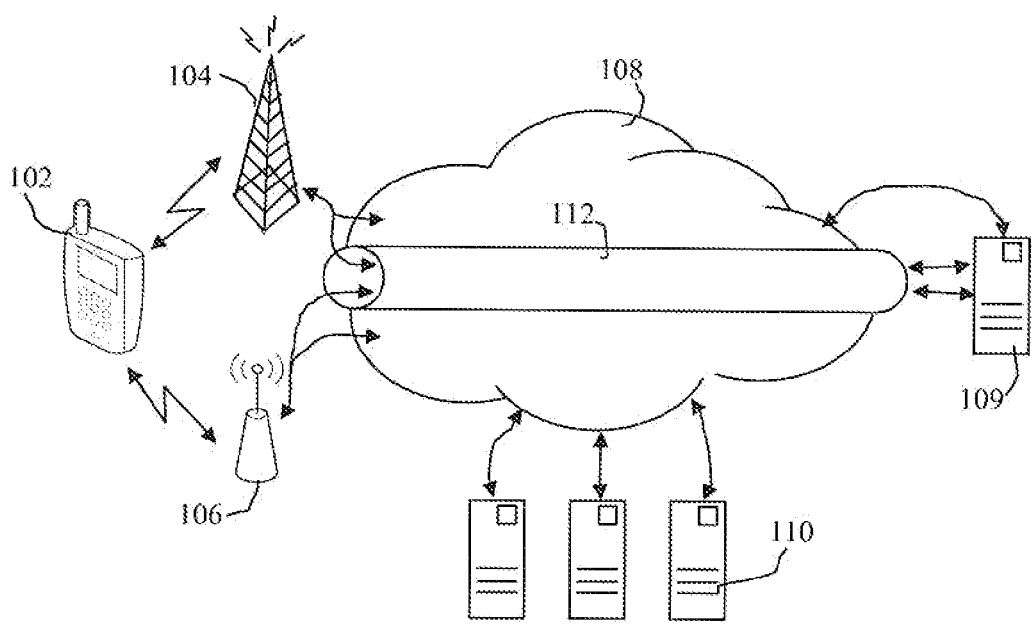
FIG. 2 is a block diagram of the tunnel illustrated in FIG. 1, the client device capable of offloading some of the network connections from the tunnel.

Referring to FIG. 2, a network environment in accordance with an embodiment of the present invention is illustrated generally by numeral 100. In the present embodiment, the client device 102 transmits data across the tunnel 112 using both the first and second interfaces, as described above. Further, some data is transmitted across the Internet 108 outside of the tunnel 112 using a selected interface from one of the first or second interfaces.

In order to facilitate this, offloading software is provided on the client device 102. The offloading software is configured to determine whether the data should be transmitted across the tunnel 112 to the proxy server 109 or directly to the target server 110 via the Internet 108, bypassing the proxy server 109. Whether or not the data is transmitted across the tunnel 112 is based on a set of predefined criteria.

One of the predefined criteria is permissibility. That is, if the tunnel 112 has been established for a particular reason, offloading the data from the tunnel may defeat the purpose the tunnel was established in the first place. Consider, for example, a virtual private network (VPN) that is established for security purposes. If data is offloaded from the tunnel 112, it no longer benefits from any extra security provided therein. However, not all of the data may need the extra security. Accordingly, a tunnel administrator can establish security policies to define what type of data is permitted or not permitted to offload from the tunnel 112.

Other predefined criteria are used to determine the risk of transmitting the data outside of the tunnel 112. That is, the predefined criteria are used to determine the probability that the selected interface will be available for the full duration of the connection as well the consequences of this probability being incorrect.

In the present embodiment, in order to increase the chances that the selected interface will be available for the full duration of the connection required to transfer the data, two criteria monitored by the offloading software include traffic type and interface status.

The traffic type is monitored to determine whether or not the data transfer is likely to finish in a short period of time. For example, a request for a web page is likely to finish relative quickly. Likewise, transmitting and e-mail message is likely to finish relative quickly. Other examples of relatively short transactions include calls to services such as Web services. In contrast, Voice over Internet Protocol (VoIP) calls and streaming media can have an unknown or lengthy duration. Similarly, telepresence applications, video calling applications, and interactive applications, such as video games have unpredictable or expected lengthy durations.

Further, the traffic type is analysed to determine the consequences of the selected interface failing prior to completing the data transfer. For example, the consequence of the selected interface failing during a request for a web page is relatively insignificant as the request can be resubmitted. The consequence of the selected interface failing while transmitting an e-mail message may be relatively insignificant as the e-mail message can be resent. In contrast, the consequence of the selected interface failing during a VoIP call is relatively significant as the session will end and the call will be dropped. Similarly, the consequence of the selected interface failing while streaming media is relatively significant, as the session will end and the stream will have to be restarted.

Thus, based on the estimated duration of the data transfer and the consequences of the selected interface failing, the request for a web page and the sending of an e-mail message may be good candidates for transmission outside of the tunnel 112. However, a VoIP call may not be a good candidate for transmission outside of the tunnel 112. Streaming media may be a candidate for transmission outside of the tunnel 112 depending on parameters established for the offloading software. That is, if it can be determined that the streaming media will only be required for a short duration, it may be work the risk to transmit the data outside of the tunnel 112 even though the session will end if the selected interface fails. A risk threshold for such a decision can vary, depending on the implementation, and may be set by the user of the client device 102, a system administrator, or may be dictated by the proxy server 109. Alternatively, the risk threshold may be dynamically modified by the offloading software based, at least in part, on previous attempts to transmit data outside of the tunnel 112.

The interface status of each of the first interface and the second interface is monitored for determining the probable lifetime thereof. A number of different parameters can be assessed to determine the interface status. For example, the signal strength can be analyzed. This includes the current signal strength and, possibly, a history of the signal strength to determine if it is trending up or down. As another example, motion is detected. This can be achieved using any of a number of known techniques. The detection of motion may indicate that a local wireless connection, such as that of the second interface with the Wi-Fi access point, will be short-lived. Further, the user's historical patterns or calendar could be monitored to determined when the user will be likely to chance locations. For example, the user may routinely leave home for work at 8 AM at which point an, existing home Wi-Fi connection could be lost. As another example, if the user has an out of office meeting scheduled for 10 AM, an existing office Wi-Fi connection could be lost.

Thus, most favourable situation is if both the first interface and the second interface have an interface status indicating a long possible lifetime. Which of the interfaces is chosen as the selected interface can be made based on one or more a number of different parameters, including which interface is estimate to have the longest lifetime, which has the strongest signal, which has the higher bandwidth available, and the like.

The next most favourable situation is if one of the first interface or the second interface have an interface status indicating a long possible lifetime. Which of the interfaces is chosen as the selected interface can be made based on the parameters discuss above, however more weight is given to the interface that is estimated to have a long possible lifetime. A connection that is expected to only require a very short duration may still be established on the interface indicating a short possible lifetime, depending on the risk threshold.

The least favourable situation is if both the first interface and the second interface have an interface status indicating a short possible lifetime. In such a circumstance it is least likely that a connection will be established outside of the virtual tunnel. However, a connection that is expected to only require a very short duration may still be established on one of the first or second interfaces, even though they indicate a short possible lifetime, depending on the risk threshold.

Figure 3A:
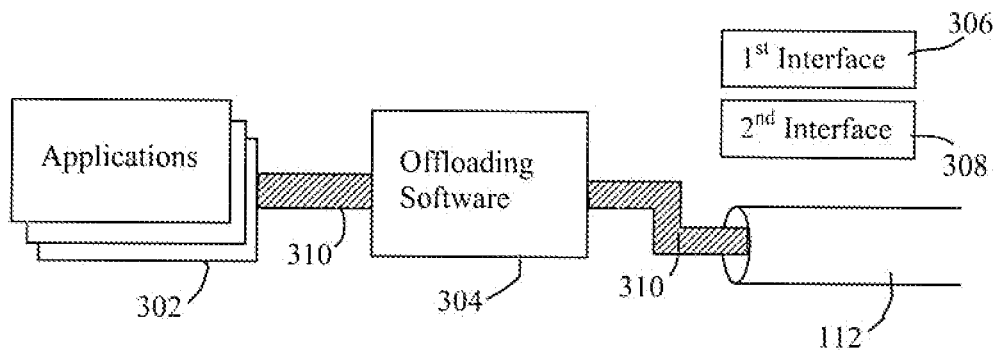
FIGS. 3a-3e are block diagrams illustrating the steps the client device takes when offloading the network connections.
Figure 3B:
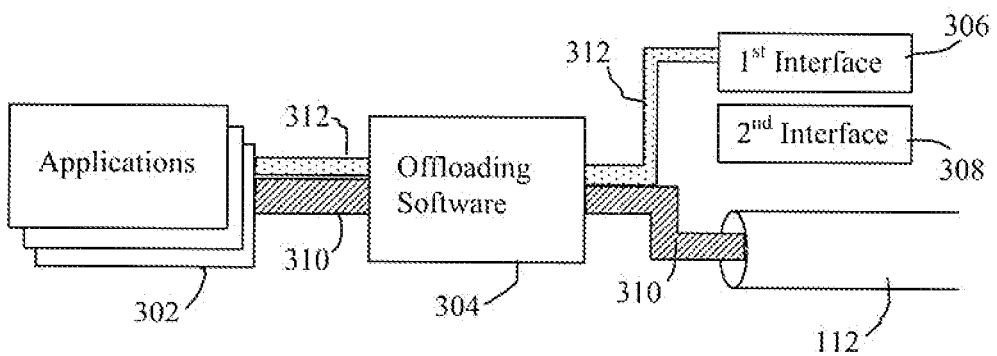
Figure 3C:
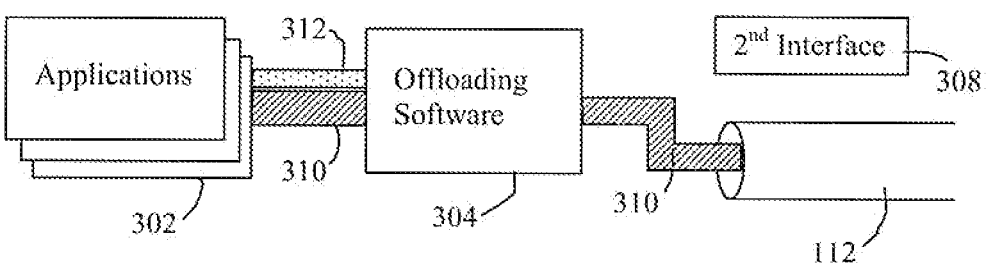

Referring to FIGS. 3a to 3c, block diagrams are shown for illustrating the steps taken at the client device 102 to offload data from the tunnel 112. Shown in these figures are a plurality of applications 302, the offloading software 304, the tunnel 112, the first interface 306 and the second interface 308. As will be appreciated, these diagrams illustrate a logical flow and not the actual physical connections. For example, the tunnel 112 transmits data over one or both of the first interface 306 and the second interface 308.

As illustrated in FIG. 3a, a connection or connections 310 are established from the applications across the virtual tunnel 112. As illustrated in FIG. 3b, one or more of the applications 302 requests a new connection 312. In this example, the offloading software 304 determines that the connection will be a relatively short connection. This presents a low risk, which is below the risk threshold, and offloads it from the virtual tunnel 112 to the first interface 306, which has a good interface status. However, as illustrated in FIG. 3c, a short time after the new connection 312 is established, but before it has been completed, the first interface 306 unexpectedly fails or enters a degraded state.

Figure 3D:
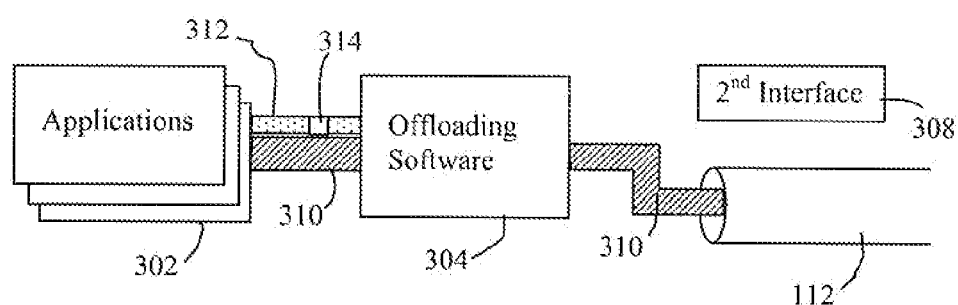

According, as illustrated in FIG. 3d, the offloading software 304 detects that the first interface 306 has failed and injects a network event 314 into the new connection 312 to force the new connection 312 to close. The network event 314 can be one of a number of different events that would force the closure of the new connection 312 including; an in-band message such as a Transmission Control Protocol (TCP) reset RST; and an out-of-band message such as an Internet Control Message Protocol (ICMP) message. Other in-band or out-of-band messages may also be used to force the new connection 312 to close.

Figure 3E:
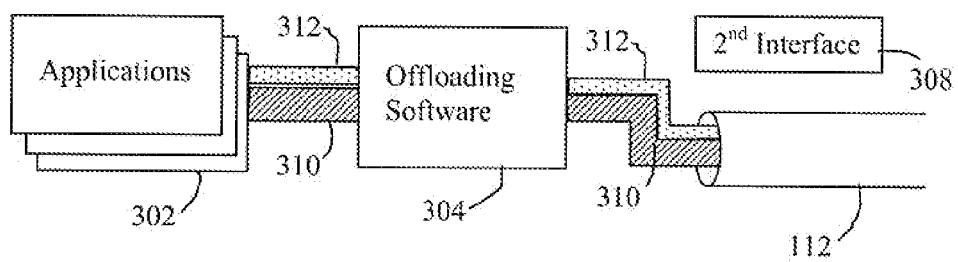

As illustrated in FIG. 3e, the application 302 responds to the network event 314 by retrying the connection. At this point, the offloading software 304 determines, based on the previous attempt to establish the new connection and with the continued loss of the first interface 306, to establish the retried connection via the tunnel 112.

It will be appreciated that the example described with reference to FIGS. 3a-3e is intended to be exemplary. Depending on the circumstances and the parameters established by the user or the system administrator, the offloading software 304 may continue to retry establishing the retried connection outside of the tunnel 112 before attempting to establishing it via the tunnel 112.

Accordingly, the client device 102 can dynamically offload low-risk traffic outside of the tunnel 112, reducing the load on the proxy server, while also providing a mechanism to bring that traffic back inside the tunnel 112 should conditions warrant it. This solution alleviates at least a portion of the load placed on the hardware requirements for the proxy server 109 and leverages the existing Internet infrastructure without significantly affecting data transmitted between the client device 102 and the proxy server 109.

Although the embodiment described above reference a tunnel configured to establish a connection with the proxy server across a plurality of different access points using a corresponding plurality of different network interfaces, the solution described also works for a more traditional one-interface VPN between a client device and an endpoint server.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the terms "software" and "application" as used herein are intended to encompass a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations and combinations may be made thereto without departing from the scope of the appended claims.

What is claimed is:

1. A method for reducing a load placed on an endpoint server acting as an endpoint of a tunnel from a client device across a network the method, implemented at the client device, comprising:
   receiving a request to establish a new network connection;
   determining a risk establishing the new network connection outside of the tunnel, the risk based on a plurality of predefined criteria relating to the new network connection; comparing the determined risk with a predefined risk threshold;
   when the determined risk is less than or equal to the predefined risk threshold, establishing the new network connection directly via the network outside of the tunnel, wherein if the new network connection fails before it is completed it is re-established via the tunnel;
   attempting to re-establish the new network connection directly via the network outside of the tunnel before re-establishing the new network connection via the tunnel; and
   when the determined risk is greater than the predefined risk threshold, establishing the new network connection via the tunnel.

2. The method of claim 1, wherein the attempt to establish the new network connection is limited to a predefined number of attempts.

3. The method of claim 1, further comprising: forcing the new network connection to close if it fails before it is completed.

4. The method of claim 3, wherein the new network connection is forced to close by injecting a network event into the new network connection.

5. The method of claim 4, wherein the network event is in in-bounds message or an out-of-bounds message.

6. The method of claim 1, wherein the predefined criteria include one or more of a security policy, traffic type, interface status or consequence of failure.

7. The method of claim 6, wherein the security policy identifies which type of data can be offloaded from the tunnel without violating the purpose for the tunnel.

8. The method of claim 6, wherein the traffic type indicates whether or not new network connection is expected to be a short duration.

9. The method of claim 6, wherein the interface status indicates one or both of a potential for motion of the client device or a quality of signal.

10. A client device configured for reducing a load placed on an endpoint server acting as an endpoint of a tunnel from the client device across a network, the client device comprising:
    a processor, and
    a computer-readable medium having stored thereon instructions which, when executed by the processor, cause the processor to:
    receive a request to establish a new network connection;
    determine a risk establishing the new network connection outside of the tunnel, the risk based on a plurality of predefined criteria relating to the new network connection;
    compare the determined risk with a predefined risk threshold;
    when the determined risk is less than or equal to the predefined risk threshold, establish the new network connection directly via the network outside of the tunnel, wherein if the new network connection fails before it is completed it is re-established via the tunnel;
    attempting to re-establishing the new network connection directly via the network before re-establishing the new network connection via the tunnel; and
    when the determined risk is greater than the predefined risk threshold, establish the new network connection via the tunnel.

11. A non-transitory computer-readable medium having stored thereon instructions for reducing a load placed on an endpoint server acting as an endpoint of a tunnel from a client device across a network, the instructions, when executed by a processor, cause the processor to implement:
    receiving a request to establish a new network connection;
    determining a risk establishing the new network connection outside of the tunnel, the risk based on a plurality of predefined criteria relating to the new network connection; comparing the determined risk with a predefined risk threshold;
    when the determined risk is less than or equal to the predefined risk threshold, establishing the new network connection directly via the network outside of the tunnel, wherein if the new network connection fails before it is completed it is re-established via the tunnel;
    attempting to re-establishing the new network connection directly via the network before re-establishing the new network connection via the tunnel; and
    when the determined risk is greater than the predefined risk threshold, establishing the new network connection via the tunnel.

12. The non-transitory computer-readable medium of claim 11, comprising further instructions for forcing the new network connection to close if it fails before it is completed.

13. The non-transitory computer-readable medium of claim 12, wherein the new network connection is forced to close by injecting a network event into the new network connection.

14. The non-transitory computer-readable medium of claim 13, wherein the network event is in in-bounds message or an out-of-bounds message.

15. The client device of claim 10, comprising further instructions for forcing the new network connection to close if it fails before it is completed.

16. The client device of claim 15, wherein the new network connection is forced to close by injecting a network event into the new network connection.

17. The client device of claim 16, wherein the network event is in in-bounds message or an out-of-bounds message.

* * * * *